(12) United States Patent
DiMauro

(10) Patent No.: US 6,842,993 B1
(45) Date of Patent: Jan. 18, 2005

(54) UTILITY BOX TEMPLATE

(76) Inventor: Robert T. DiMauro, 919 Brooks Rd., Middletown, CT (US) 06457

( * ) Notice: Subject to any disclaimer, the term of this patent is extended or adjusted under 35 U.S.C. 154(b) by 0 days.

(21) Appl. No.: 10/412,479

(22) Filed: Apr. 11, 2003

(51) Int. Cl.$^7$ ................................................ G01B 5/00
(52) U.S. Cl. ........................ 33/528; 33/DIG. 10; 33/42; 83/574
(58) Field of Search .......................... 33/528, DIG. 10, 33/562–563, 565, 42; 83/574, 745; 30/298.4, 155, 162, 37.3

(56) References Cited

U.S. PATENT DOCUMENTS

| | | | |
|---|---|---|---|
| 2,540,032 A | | 1/1951 | Johnson et al. |
| 4,230,164 A | * | 10/1980 | Mericle ...................... 144/372 |
| 4,384,396 A | * | 5/1983 | Smolik ..................... 29/407.09 |
| 4,739,558 A | * | 4/1988 | Black ............................. 33/42 |
| 4,793,069 A | | 12/1988 | McDowell |
| 5,148,108 A | * | 9/1992 | Dufour ........................ 324/226 |
| 5,222,303 A | * | 6/1993 | Jardine ......................... 33/528 |
| 5,457,394 A | | 10/1995 | McEwan |
| 5,511,316 A | * | 4/1996 | Fischer et al. ................. 33/1 F |
| 5,615,490 A | | 4/1997 | Burchell |
| 5,630,281 A | * | 5/1997 | Pledger et al. ................. 33/528 |
| 5,704,263 A | * | 1/1998 | Swanberg ....................... 83/13 |
| 5,813,130 A | | 9/1998 | MacDowell |
| 5,860,219 A | | 1/1999 | Wilkinson |
| 5,940,979 A | * | 8/1999 | Ericksen et al. ............... 33/667 |
| 6,209,214 B1 | | 4/2001 | Talavera |
| 6,223,445 B1 | | 5/2001 | Schuette, Jr. et al. |
| 6,229,294 B1 | * | 5/2001 | Wun ............................ 324/67 |
| 6,674,276 B2 | * | 1/2004 | Morgan et al. ................ 324/67 |

* cited by examiner

*Primary Examiner*—Diego Gutierrez
*Assistant Examiner*—Tania Courson
(74) *Attorney, Agent, or Firm*—Alix, Yale & Ristas, LLP

(57) ABSTRACT

A utility box template, for installing a utility box in a building wall or ceiling formed of a framework of studs overlaid by covering material, which comprises a one-piece, unitary plate including a locator portion and a guide portion. A stud finder, for locating the studs, is mounted in the locator portion. A cutting guide, for guiding a cutting device for cutting an installation opening in the covering material, is mounted in the guide portion.

19 Claims, 4 Drawing Sheets

UTILITY BOX TEMPLATE

BACKGROUND OF THE INVENTION

This invention relates generally to a tool for placing and marking the position of a utility box in a wall, such as drywall, floor, or ceiling. A "utility box" is a device intended to be accessible through an opening in a wall such as electrical service boxes for outlets and switches, cable television and telephone connections, plumbing fixtures such as modular clothes washer water connections, and lighting fixtures such as recessed lighting cans. More particularly, the present invention relates to a device and method for marking the location and support for an utility box on wall and for creating the aperture in the wall for receiving the utility box.

During the constructing of a building, walls are typically formed by initially erecting a framework including wood or metal studs. Rough plumbing and electrical wiring is then routed through the framework. The wiring is terminated at electrical boxes mounted to the framework studs. Phone lines, speaker wire and coaxial cable for cable television wired through the framework may also terminate at electrical boxes to facilitate installation. The plumbing may also be terminated at a modular connection. Eventually, the framework, rough wiring and plumbing, and utility boxes are covered by materials such as drywall sheets, paneling, or laths that serve as a plaster base.

There are many devices for positioning utility boxes properly during new construction, when the framework is accessible. For example, U.S. Pat. No. 5,630,281 discloses a device having bearing surfaces for placement against a stud, surfaces for placement against a sole plate, and a protruding section that accepts the electrical box, such that the device holds the utility box at the proper location relative to the stud. Often, however, it is necessary to add utility boxes after the construction has been completed. The devices that are used for aligning, or positioning, utility boxes during new construction generally require ready access to the building framework and are therefore of little assistance in remodeling applications.

Electrical boxes have been designed for installation after construction has been completed which do not attach to a stud or building framework, but mounts against the wall (generally gypsum board) and uses the wall as a support for the box. U.S. Pat. No. 6,223,445 discloses a tool for installing such utility boxes. Devices of this type are of little use with utility boxes which require mounting to the building framework, since such framework must be avoided for proper installation of the electrical boxes for which they are intended.

Known installation procedures for installing utility boxes in existing walls typically include finding a location along the wall where the gypsum board is backed by the building framework, placing a paper template over the wall to one side of the framework, where the box is to be installed, marking the wall utilizing the template, cutting the gypsum board along the locations indicated by the markings, removing the cut portion of the gypsum board and inserting the box through the opening, and then attaching the box to the framework. This method, however, is difficult to carry out without damaging the gypsum board or producing an installation that is correctly positioned, with the side edges of the box being in a straight vertical orientation and properly aligned with the side of the framework. Many of the problems associated with improper positioning of the box stem from the difficulties associated with the use of a paper template to mark the outline of the location to be cut from the gypsum board to install the box.

Alternatively, the utility box itself may be used as the "template" for marking the wall. With this method, the utility box is held against the wall and the wall is marked by tracing around the box with a pen or pencil. The user may simultaneously hold a carpenter's level on top of the box. This is difficult to do, since the top edge of some utility boxes are not regularly shaped and the level interferes with the tracing. In many cases, the installer merely "eyeballs" the correct position, resulting in irregularly-positioned utility boxes.

SUMMARY OF THE INVENTION

Briefly stated, the invention in a preferred form is a utility box template, for installing a utility box in a building wall or ceiling formed of a framework of studs overlaid by covering material, which comprises a one-piece, unitary plate including a locator portion and a guide portion. A stud-finder, for locating the studs, is mounted in the locator portion. A cutting guide, for guiding a cutting device for cutting an installation opening in the covering material, is mounted in the guide portion.

The plate includes front and rear plate halves which are fixedly mounted together to define a cavity in the locator portion for housing the stud-finder. The plate halves may be composed of metal or a polymeric material. If the rear plate half is composed of metal, the locator portion of the rear plate half has a window positioned proximate to the stud-finder. A sheet of polymeric material seals the window.

A level is mounted in a notch in the top edge of the plate, intermediate the two ends. A bubble level indicator of the level is visible through the notch.

The guide portion includes at least one mounting hole extending laterally through the plate for receiving a screw for mounting the template to the wall or ceiling. The guide portion also includes first and second guide slots which extend laterally through the plate. A first segment of the plate separates the first end of the first guide slot from the second end of the second guide slot and a second segment of the plate separates the first end of the second guide slot from the second end of the first guide slot. The guide slots substantially define the outer shape of the utility box. For use with utility boxes having a circular outer shape, the guide slots each having substantially semi-circular shapes. For use with utility boxes having rectilinear outer shapes, the guide slots each have an L-shape.

The cutting guide comprises first and second bearings. Each of the slots includes oppositely disposed, longitudinally extending inner and outer sidewalls. Each of the sidewalls has upper and lower lips defining a groove therebetween. The first bearing is slidably mounted within the grooves of the sidewalls of the first slot and the second bearing is slidably mounted within the grooves of the sidewalls of the second slot.

It is an object of the invention to provide a new and improved template for installing utility boxes in the walls or ceilings of a building.

It is also an object of the invention to provide a template which facilitates positioning and cutting an opening in a wall or ceiling for installing a utility box.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

Figure 3:
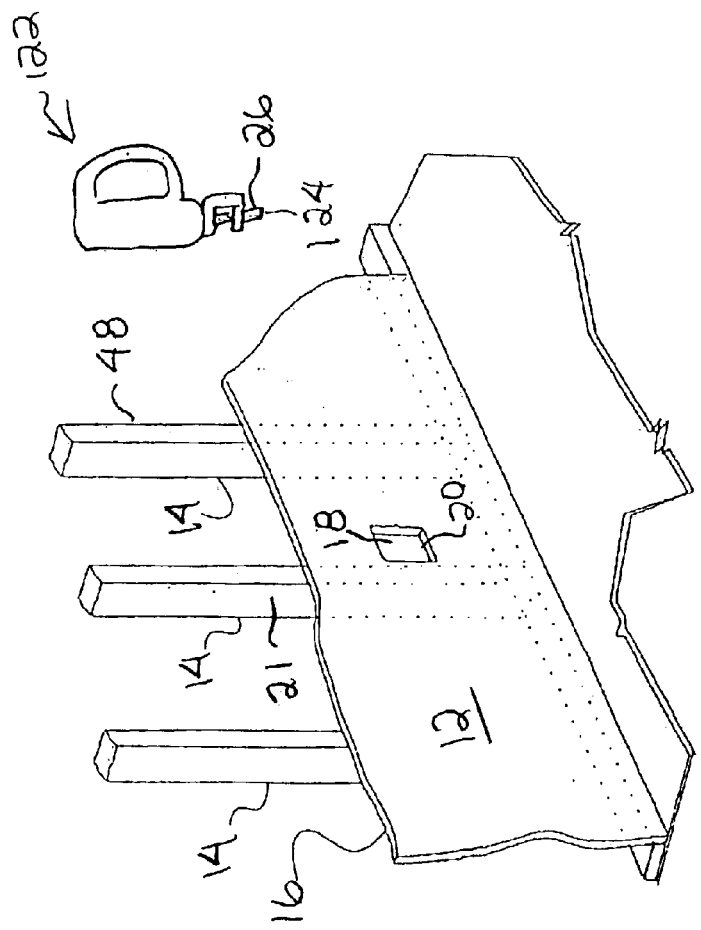
FIG. 3 is a perspective view illustrating a properly positioned opening for installation of a utility box which is to be mounted to a stud.

With reference to FIG. 3, building walls 12 are typically formed of a framework of wood or metal studs 14 which is covered by materials 16 such as drywall sheets, paneling, or a plaster base such as lathe or wire mesh. Wiring (e.g. electrical power, phone lines, speaker wire, coaxial cable, etc.) routed through the framework is terminated at electrical boxes mounted to the framework studs 14. Plumbing routed through the framework may also be terminated at a modular connection or box. When such utility boxes are installed after the covering material 16 is already mounted on the studs 14, a mounting site 18 must be located and an installation opening 20 cut in the covering material 16 at the mounting site 18. For a side-mounted utility box (i.e. a utility box which is to be mounted to the side 21 of one of the studs 14), the mounting site 18 and installation opening 20 may be located and cut utilizing a utility box template 10 in accordance with the present invention.

Figure 1:
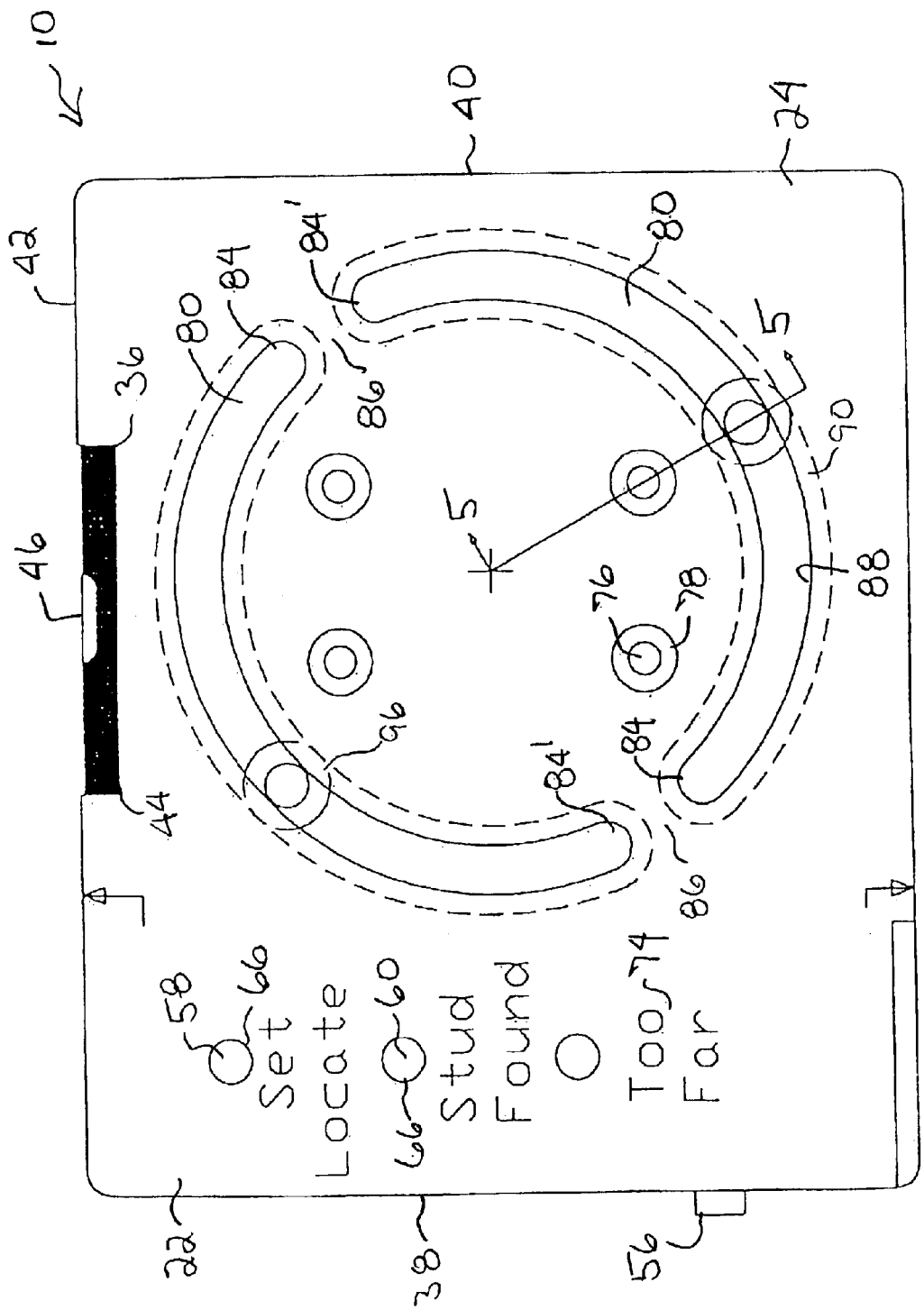
FIG. 1 is a front view of a first embodiment of a utility box template in accordance with the invention.
Figure 2:
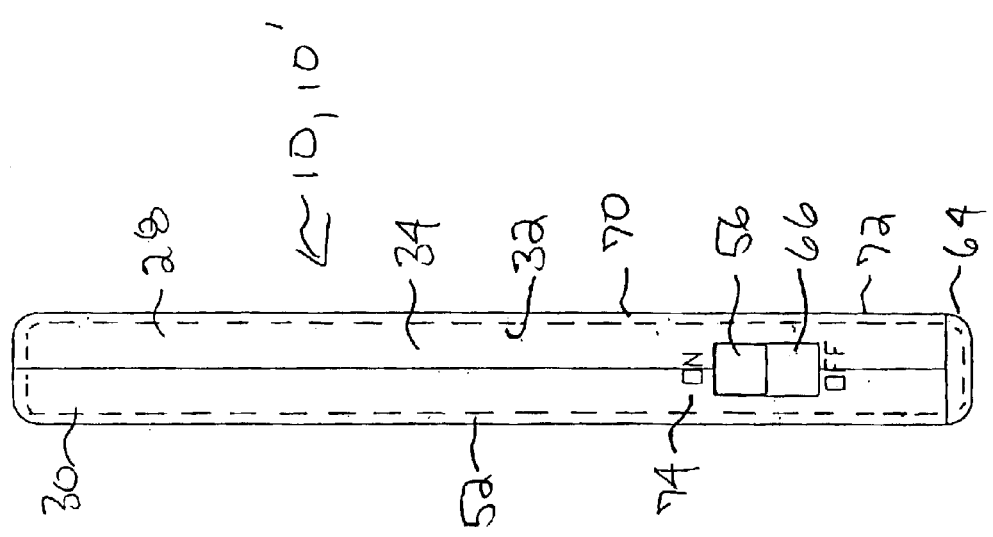
FIG. 2 is a top view of the utility box template of FIG. 1.
Figure 4:
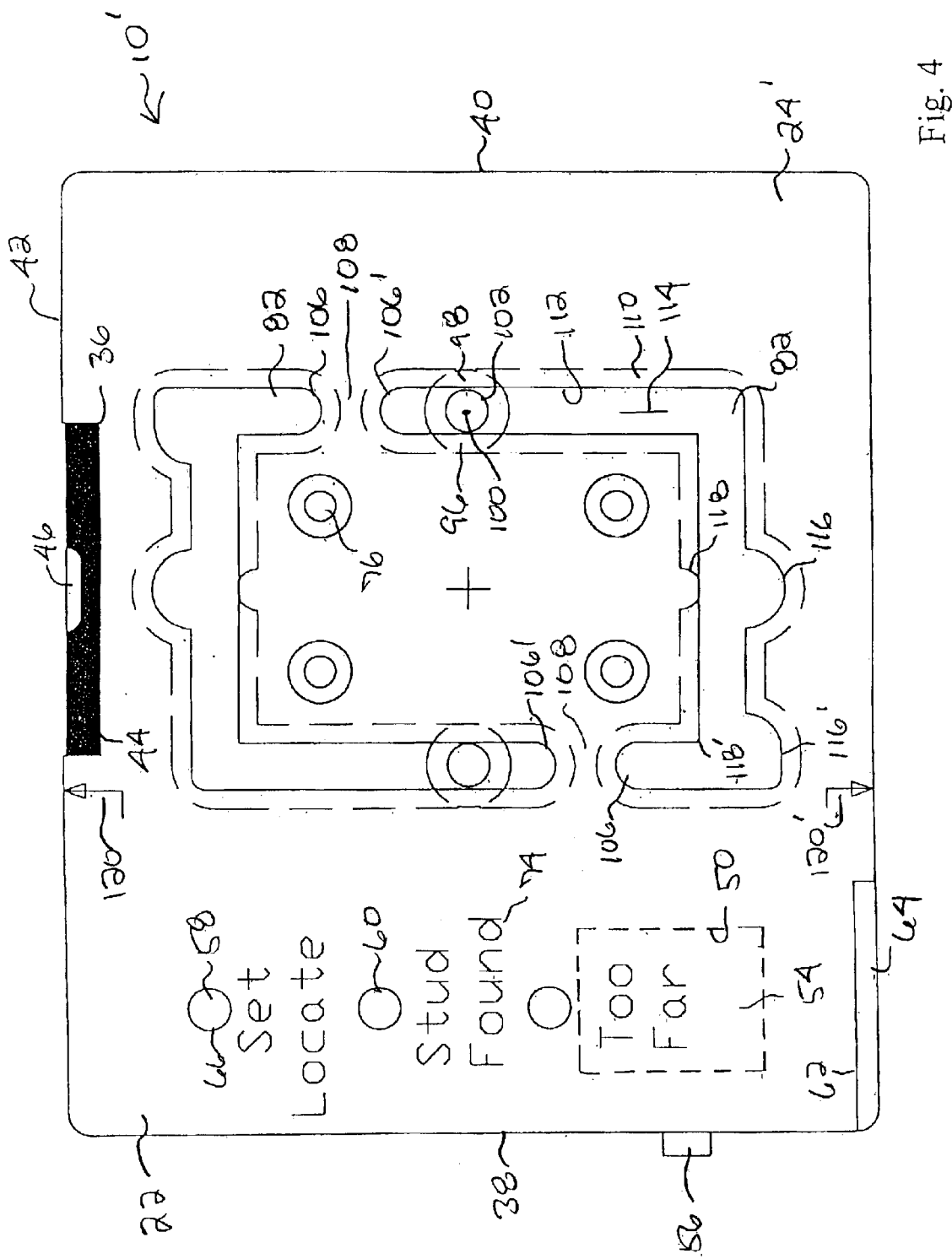
FIG. 4 is a front view of a second embodiment of a utility box template in accordance with the invention.

The utility box template 10 of FIG. 1 is used for the installation of a conventional round utility box. Whereas, the utility box template 10' of FIG. 4 is used for the installation of a rectangular utility box. Both templates 10, 10' are a one-piece, unitary plate including a locator portion 22, for locating a suitable mounting site 18, and a guide portion 24, 24' for guiding a cutting device 26 for cutting the installation opening 20. Preferably, each template 10, 10' includes front and rear plate halves 28, 30 (FIG. 2) which are fixedly mounted together to form a single cavity 32 in the locator portion 22 for housing a stud-finder 34. The plate halves 28, 30 may be composed of metal or a polymeric material having mechanical properties to resist warping and to provide long life.

In a preferred embodiment, each plate half 28, 30 includes a notch 36 disposed intermediate the first and second ends 38, 40 of the plate half 28, 30 which extends a short distance from the top edge 42. In the assembled plate halves 28, 30, the notches 36 form a receptacle for mounting a level 44. The bubble level indicator 46 is visible from either the front or the rear of the template 10, 10'. Alternatively, the level 44 may be mounted to the top edge 42 of the assembled plate halves 28, 30.

A stud-finder 34, which is used to locate the side 21 of the stud 14 to which the utility box will be mounted, is mounted within the cavity 32 in the locator portion 22 of the template 10, 10'. The stud-finder 34 may be any conventional device, so long as such device provides a reliable method of accurately detecting the edge 48 of a stud 14 which is covered by wall material 16. For example, stud-finders 34 of the type manufactured by Zircon Corporation, which detects the stud 14 by measuring a change in the capacitance of the wall 12 due to the presence of a stud 14 while the sensor is moved along the wall surface, are generally suitable for use. If the rear plate half 30 is composed of metal and such metal would interfere with operation of the stud-finder 34, one or more windows 50 may be formed in the wall 52 of the rear plate half 30 forming the cavity 32 to remove the metal in the area of the sensor device of the stud-finder 34. Preferably, a sheet 54 of polymeric material seals the window 50 to prevent the ingress of dirt, etc.

Generally, conventional stud-finders 34 include one or more batteries which provide a replaceable source of power, an ON/OFF switch 56, an operator 58 for calibrating the stud-finder and one or more light emitting diodes 60 (LEDs) to provide a visual indication of the on/off status, mode of operation, and when a stud 14 is sensed. A doorway 62 in the template 10, 10' is positioned and sized to facilitate installation and removal of the batteries. A door 64 removably mounted in the doorway 62 helps retain the batteries within the template 10, 10' and prevents intrusion of dirt and other foreign matter. An opening 66 in the template 10, 10' provides access for operating the ON/OFF switch 56. One or more openings 66 are provided which extend through the wall 70 of the front plate half 28. If the LEDs 60 are mounted on the stud-finder 34 within the cavity 32, an associated opening 66 is provided in the wall 70 of the front plate half 28 for viewing each LED 60. If the LEDs 60 are mounted on the outer surface 72 of the wall 70 of the front plate half 28, the wires providing electrical communication between the LEDs 60 and the electronics of the stud-finder 34 extend through one or more openings 66. Preferably, indicia 74 on the outer surface 72 of the template 10, 10' provide an indication as to the function of the associated LED 60 and the ON position and the OFF position of the ON/OFF switch 56.

The guide portion 24 of each template 10, 10' includes at least one mounting hole 76 which extends laterally through both plate halves 28, 30 for mounting the template 10, 10' to the wall 12 after the template 10, 10' has been positioned at the mounting site 18, as described below. Preferably, multiple mounting holes 76 are provided and the template 10, 10' is mounted to the wall 12 by at least two flat-head screws 77 such that the template 10, 10' may not move around the screws 77 as the installation opening 20 is cut. A chamfer 78 is formed around each mounting hole 76 to receive the head 79 of the screw 77. The top 81 of each screw 77 must be flush with the outer surface 72 of the front plate half 28 when the template 10, 10' is mounted to the wall 12 to ensure that the screws 77 do not interfere with operation of the cutting tool 26 when the installation opening 20 is cut.

Figure 5:
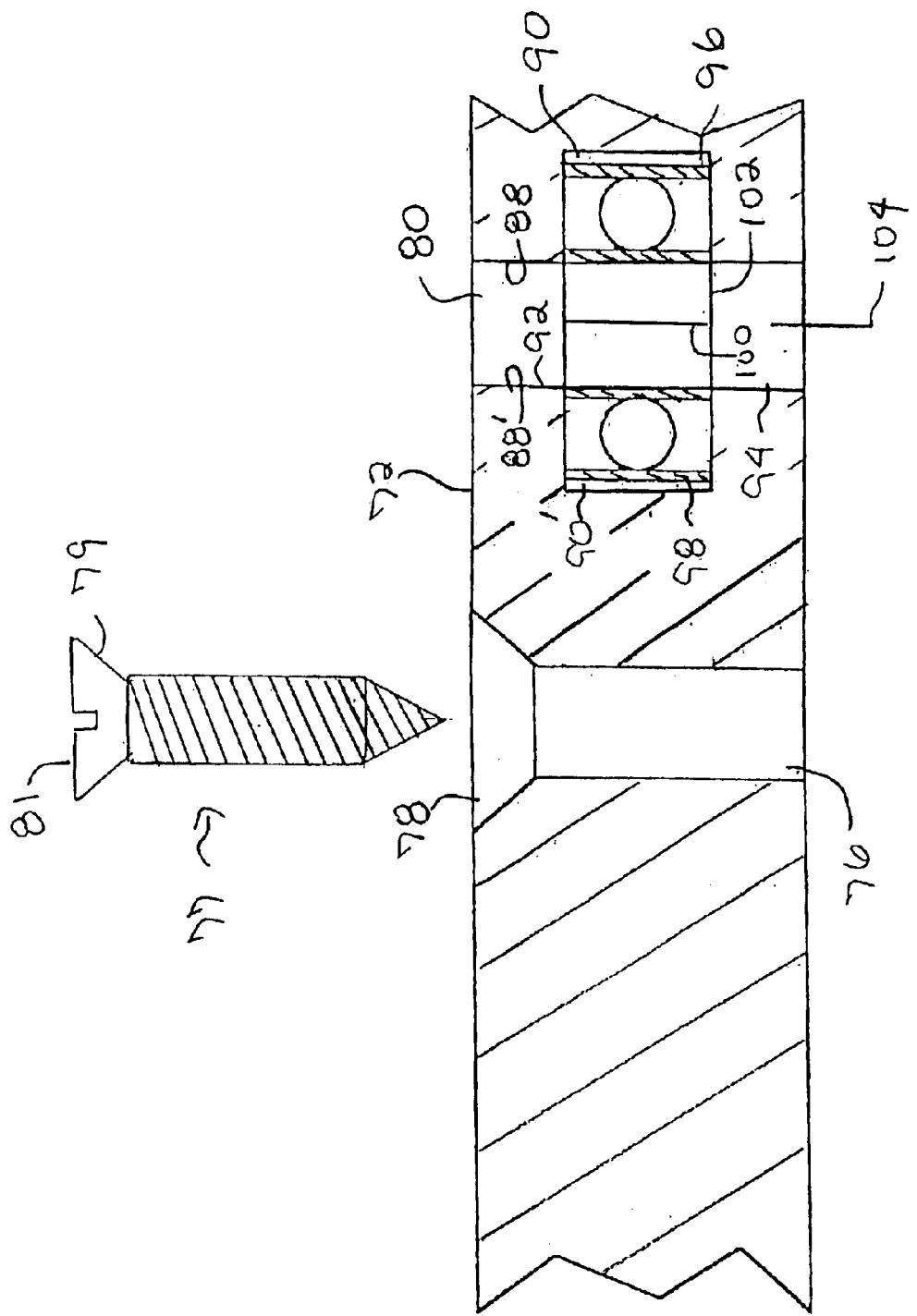
FIG. 5 is a cross-sectional view taken along line 5—5 of FIG. 1.

The guide portion of each template 10, 10' also includes two guide slots 80, 82 which extend laterally through both plate halves 28, 30. In the template 10 for the round utility box, each guide slot 80 is a substantially semi-circular arc. Together, the two slots 80 form an incomplete circle, with ends 84, 84' of the semi-circular slots 80 being separated by a relatively narrow segment 86 of the plate halves 28, 30. Preferably, the sidewall 88 of each slot 80 has a groove 90, with the upper and lower sidewall segments 92, 94 formed by the groove 90 each defining a lip (FIG. 5). A single bearing 96 is held within the groove 90, of each slot 80 by the upper and lower sidewall segments 92, 94, with the outer race 98 being slidably movable within the groove 90 along the length of the slot 80 and the axis 100 of the inner journal 102 extending substantially on the transverse centerline 104 of the slot 80.

In the template 10' for the rectangular utility box, each guide slot 82 is substantially one-half of a rectangle. For example, each slot 82 may have an L-shape (as shown in FIG. 4). Together, the two guide slots 82 form an incomplete rectangle, with the ends 106, 106' of the slots 82 being separated by a relatively narrow segment 108 of the plate halves 28, 30. A groove 110 in the sidewall 112 of each slot 82 carries a single bearing 96, similar to template 10, with the outer race 98 being slidably movable within the groove 110 along the length of the slot 82 and the axis 100 of the inner journal 102 extending substantially on the transverse centerline 114 of the slot 82. Each semi-rectangular slot 82 may include one or more notched segments 116, 116' to facilitate formation of similar shaped notches in the installation opening 20. Such notches are required to receive portions of certain types of the rectangular utility boxes. As shown in FIG. 4, the groove 110 is continued in the sidewall 112 of the notched segment 116 while the opposite side wall 112 includes a guide element 118, 118' to ensure that the bearing 96 is biased into the notched segment 116 and to prevent the bearing 96 from leaving the slot 82. The guide element may have the form of a rounded protrusion 118 or an extension of the side wall 118'.

To locate the mounting site 18, the template 10, 10' appropriate to the utility box is placed against the wall 12 and the stud-finder 34 is operated in accordance with the manufacturer's instructions to locate a stud 14 in the general area in which it is desired to locate the utility box. The template 10, 10' is then moved to the desired vertical height for the installed utility box and the side edge 48 of the stud 14 is located with the stud finder 34. Arrows 120, 120' on the front face of the template 10, 10' are then aligned with the side edge 48 of the stud 14, the template 10, 10' is leveled utilizing level 44, and the template 10, 10' is mounted to the wall 12 with at least one, preferably at least two, flat-head screws 77. It should be appreciated that both arrows 120, 120' will not align with the side edge 48 of the stud 14 when the template 10, 10' is leveled if the stud 14 is warped at the selected mounting site 18 or if the stud 14 is not vertically true. If the utility box must be mounted at this mounting site 18, the template 10, 10' should be leveled while holding one of the arrows 120, 120' aligned with the side edge 48 of the stud 14 and allowing the other arrow 120', 120 to move away from the side edge 48 of the stud 14. One or more shims may be installed with the utility box to fill the gap between the utility box and the side 21 of the stud 14 which is created by positioning the template 10, 10' in this manner.

A rotary cutting tool 122, such as the type manufactured by Rotozip, is preferably used to cut the installation opening 20. If a cutting tool of a different type is used, such as a jig saw, a bushing or other appropriate wear reducing device is used in place of bearing 96. The cutting device or bit 26 of the rotary cutting tool 122 is inserted through the journal 102 of one of the bearings 96 such that the tip 124 of the bit 26 contacts the wall material 16. When the tool 122 is started, the tip 124 penetrates the wall material 16. The operator moves the rotary tool 122 the full length of the slot 80, 82, the bearing 96 guiding the bit 26, to cut an opening in the wall material 16 which has a shape corresponding to the shape of the slot 80, 82. The cutting tool 122 is de-energized, the bit 26 is removed from the first bearing 96 and inserted through the journal 102 of the other bearing 96, and the cutting operation is repeated to form an opening in the wall material 16 corresponding to the other slot 80, 82. After the cutting tool 122 is again de-energized and the bit 26 removed from bearing 96, the operator removes the screws 77 mounting the template 10, 10' to the wall 12. The operator then cuts through the tabs corresponding to segments 86, 108 and removes the portion of the wall material which has now been completely cut from the wall 12. A utility box may then be inserted into the installation opening 20 thus formed and mounted to the side 21 of the stud 14.

While preferred embodiments have been shown and described, various modifications and substitutions may be made thereto without departing from the spirit and scope of the invention. For example, a single plate of unitary construction may be used instead of the plate halves 28, 30 described above. It is expected that plate halves 28, 30 having the features described above may be manufactured utilizing simpler and less expensive processes than would be required to produce a corresponding unitary plate. In another example, the stud finder 34 may be mounted to the side of the guide portion 24 rather within the cavity 32. Accordingly, it is to be understood that the present invention has been described by way of illustration and not limitation.

What is claimed is:

1. A utility box template for installing a utility box in a building wall or ceiling formed of a framework of studs overlaid by covering material, a perimeter of the utility box having an outer shape, the template comprising:
   a one-piece, unitary plate including a locator portion and a guide portion;
   a stud-finder mounted in the locator portion, the stud finder being adapted for locating a one of the studs; and
   a cutting guide mounted in the guide portion, the cutting guide including bearing means slidably mounted and adapted for receiving at least a portion of a cutting device for guiding the cutting device while cutting an installation opening in the covering material.

2. The utility box template of claim 1 wherein the plate includes front and rear plate halves which are fixedly mounted together to define a cavity in the locator portion for housing the stud-finder.

3. The utility box template of claim 2 wherein the plate halves are composed of metal or a polymeric material.

4. The utility box template of claim 2 wherein the rear plate half is composed of metal, the locator portion of the rear plate half defining a window positioned proximate to the stud-finder.

5. The utility box template of claim 4 wherein the plate also includes a sheet of polymeric material sealing the window.

6. The utility box template of claim 1 further comprising a level.

7. The utility box template of claim 6 wherein the plate also includes oppositely disposed first and second ends and oppositely disposed top and bottom edges, the plate defining a notch extending downward from the top edge, intermediate the first and second ends, the level being mounted within the notch.

8. The utility box template of claim 7 wherein the level includes a bubble level indicator visible through the notch.

9. The utility box template of claim 1 further comprising a stud finder ON/OFF switch, a stud-finder operator, and at least one stud finder visual indicator.

10. The utility box template of claim 1 wherein the guide portion defines at least one mounting hole extending laterally through the plate, the mounting hole being adapted for receiving a screw for mounting the template to the wall or ceiling.

11. The utility box template of claim 10 wherein the plate defines a chamfer around the mounting hole adapted for receiving the head of the screw.

12. The utility box template of claim 1 wherein the guide portion includes first and second guide slots extending laterally through the plate, each of the guide slots extending longitudinally from a first end to a second end, a first segment of the plate separating the first end of the first guide slot from the second end of the second guide slot, a second segment of the plate separating the first end of the second guide slot from the second end of the first guide slot.

13. The utility box template of claim 12 wherein the first and second guide slots substantially define the outer shape of the utility box.

14. The utility box template of claim 12 wherein the first and second guide slots each have substantially semi-circular shapes.

15. The utility box template of claim 12 wherein the first and second guide slots each have an L-shape.

16. The utility box template of claim 12 wherein the cutting guide includes first and second bearings and each of the slots includes oppositely disposed, longitudinally extending inner and outer sidewalls, each of the sidewalls of each slot having upper and lower lips defining a groove therebetween, the first bearing being slidably mounted within the grooves of the sidewalls of the first slot and the second bearing being slidably mounted within the grooves of the sidewalls of the second slot.

17. The utility box template of claim 16 wherein each of the slots has a transverse centerline and each of the bearings has an axis, the axis of each bearing being disposed substantially on the transverse centerline of the respective slot.

18. The utility box template of claim 16 wherein at least one of the slots includes at least one notched segment, the outer sidewall in the notched segment defining a groove segment, the inner sidewall of the notched segment defining guide element.

19. A utility box template for installing a utility box in a building wall or ceiling formed of a framework of studs overlaid by covering material, a perimeter of the utility box having an outer shape, the template comprising:

a one-piece, unitary plate including a locator portion and a guide portion, the guide portion including first and second guide slots extending laterally through the plate, each of the guide slots extending longitudinally from a first end to a second end, a first segment of the plate separating the first end of the first guide slot from the second end of the second guide slot, a second segment of the plate separating the first end of the second guide slot from the second end of the first guide slot, each of the slots including oppositely disposed, longitudinally extending inner and outer sidewalls, each of the sidewalls of each slot having upper and lower lips defining a groove therebetween;

a stud-finder mounted in the locator portion, the stud finder being adapted for locating a one of the studs; and first and second bearings, the first bearing being slidably mounted within the grooves of the sidewalls of the first slot and the second bearing being slidably mounted within the grooves of the sidewalls of the second slot, each of the bearings being adapted for receiving at least a portion of a cutting device for guiding the cutting device while cutting an installation opening in the covering material.

\* \* \* \* \*